UNITED STATES PATENT OFFICE 2,671,810

LONG-CHAIN DIKETONES

Donald Drake Coffman, West Chester, Pa., and Harry Norman Cripps, Wilmington, Del., assignors to E. I. du Pont de Nemours & Company, Wilmington, Del., a corporation of Delaware No Drawing. Application May 24, 1952,
Serial No. 289,890

13 Claims. (Cl. 260—593)

This invention relates to long-chain diketones and their preparation and, more particularly, to a new class of long-chain unsaturated diketones.

Short-chain diketones, i. e., those having from 1 to 6 carbon atoms separating the two carbonyl groups, are well known and can be prepared readily by various methods. However, long-chain diketones are more difficult to prepare. Such long-chain diketones are desired for a number of applications such as for plasticizers, surface-active agents and as intermediates in the formation of condensation polymers. Consequently, improved methods for their preparation are desirable.

An object of the present invention is to provide a new process of preparing long-chain diketones. A further object is to provide a new class of long-chain unsaturated diketones. Other objects will be apparent from the description of the invention given hereinafter.

The above objects are accomplished according to the present invention by contacting an ethylenically unsaturated compound with a tertiary cyclic hydroperoxide in the presence of a redox reducing agent, in a solvent for the reactants. The invention further comprises, as a new class of compounds, those long-chain unsaturated diketones having two nonconjugated ethylenic double bonds, of the formula

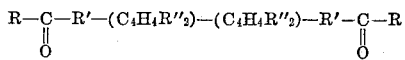

wherein R is alkyl, aryl, or aralkyl, R' is an acyclic saturated hydrocarbon radical having a chain of at least 4 carbon atoms separating the carbonyl and (C$_4$H$_4$R''$_2$) groups, and R'' is hydrogen, halogen, alkyl, aryl, or aralkyl. From the foregoing it will be apparent that the new class of diketones of this invention have a minimum of 16 carbon atoms separating the carbonyl groups.

With respect to the new unsaturated diketones of this invention as defined above, these diketones are derived from a specific type of ethylenically unsaturated compound, viz., conjugated dienes, and preferably 1,3-conjugated dienes. Therefore, the group (C$_4$H$_4$R''$_2$) in the above formula includes the two possible radicals derived from the specific diene selected. For example, the use of 1,3-butadiene leads to the formation of three isomers:

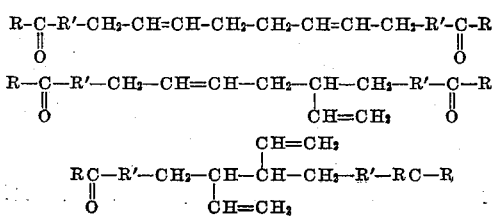

The process of this invention can be carried out conveniently by contacting an ethylenically unsaturated compound, e. g., 1,3-butadiene, with a tertiary cyclic hydroperoxide, e. g., 1-methyl-cyclopentyl hydroperoxide, in the presence of a redox reducing agent, i. e., one of the reducing agents commonly used in the redox art, such as ferrous sulfate, in a solvent for the reactants. Preferably, the liquid tertiary cyclic hydroperoxide or a solution thereof, and a solution containing a stoichiometric amount of the reducing agent are added gradually and simultaneously with thorough agitation to a solution of an excess of the ethylenically unsaturated compound.

The long-chain diketones obtained by the process of this invention are isolated from the reaction mixture by conventional methods. A generally satisfactory way consists in removing excess volatile reactants by evaporation and then, if an aqueous reaction medium has been employed, extracting the reaction mixture with an organic solvent, e. g., diethyl ether, to separate the product from the aqueous layer. The extract is then heated to remove the ether. The residue, if a solid, can be purified by recrystallization. If it is a liquid, the residue can be purified by fractional distillation at reduced pressure.

The process of this invention is illustrated by the following equations showing the reduction of 1-methyl-cyclopentyl hydroperoxide in the presence of 1,3-butadiene and ferrous sulfate as the redox reducing agent:

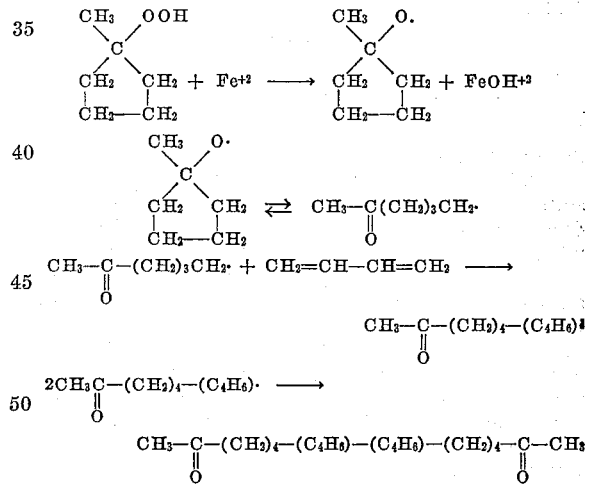

The following examples illustrate specific embodiments of this invention.

Example I

A solution of 50.0 g. (0.18 mole) of ferrous sulfate heptahydrate in 100 ml. of nitrogen-saturated distilled water, and 21.0 g. (0.18 mole) of pure liquid 1-methylcyclopentyl hydroperoxide are added simultaneously at equivalent rates to a rapidly stirred solution of 27.0 g. (0.5 mole) of 1,3-butadiene in 100 ml. of nitrogen-saturated methanol at −20° C. to −10° C. The rate of addition of the reactants is regulated so that the reaction temperature can be maintained at −20° C. to −10° C., approximately four minutes being required to complete the addition. The reaction mixture is then stirred for ten minutes to complete the reaction. The crude reaction mixture is extracted with three 100-ml. portions of diethyl ether. On evaporation of the ether from the combined extracts there is obtained 24.8 g. of reaction product consisting of 6.5 g. of white solid (A) and 18.3 g. of a clear liquid (B). The white solid (A), after recrystallization from ethanol melts at 64–65.5° C. A major proportion of this product comprises 8,12-eicosadiene-2,19-dione.

Anal.—Calcd. for $C_{20}H_{34}O_2$: C, 78.04%; H, 11.20%. Found: C, 77.80%, 77.86%; H, 11.19%, 11.09%.

This solid diketone forms a 2,4-dinitrophenylhydrazone which melts at 115–130° C., the broad melting point range presumably due to presence of isomeric materials.

Anal.—Calcd. for $C_{32}H_{42}N_8O_8$: C, 57.6%; H, 6.35%; N, 16.82%. Found: C, 57.82%, 57.64%; H, 6.52%, 6.34%; N, 16.88%, 16.97%.

The solid diketone also forms a semicarbazone which melts sharply at 182–182.5° C.

Anal.—Calcd. for $C_{22}H_{40}N_6O_2$: C, 62.80%; H, 9.59%; N, 20.0%. Found: C, 62.86%, 62.30%, 62.90%; H, 10.00%, 9.51%, 9.47%; N, 19.75%, 19.66%.

Hydrogenation of a mixture of 1.6 g. of solid (A) and 1.4 g. of liquid (B) produces 1.85 g. of eicosane-2,19-dione, a white solid melting at 92.5–93° C. (melting point reported in the literature is 92–93° C.).

Anal.—Calcd. for $C_{20}H_{38}O_2$: C, 77.40%; H, 12.30%. Found: C, 77.04%, 77.44%, 77.07%; H, 12.32%, 12.39%, 12.38%.

The hydrogenated diketone, eicosane-2,19-dione, forms a dioxime melting at 110–114° C.

Anal.—Calcd. for $C_{22}H_{40}N_6O_2$: C, 70.51%; H, 11.83%; N, 8.22%. Found: C, 70.76%, 70.03%, 70.30%; H, 11.89%, 11.85%, 11.83%; N, 8.42%, 8.34%.

Example II

A solution of 37.5 g. (0.135 mole) of ferrous sulfate heptahydrate in 81.2 ml. of air-free distilled water and 16.79 g. (0.131 mole) of 1-methylcyclohexyl hydroperoxide are added at equivalent rates over a four-minute period to a solution of 21.6 g. (0.4 mole) of liquid 1,3-butadiene in 50 ml. of nitrogen-saturated methanol, with the reaction mixture maintained at −20° C. to −10° C. The reaction mixture is then stirred another ten minutes to complete the reaction whereupon 100 ml. of water is added. The product is separated from the undesired iron salts by extraction with one 100-ml. and three 50-ml. portions of diethyl ether. The ether extracts are combined and the ether is removed by evaporation, leaving 19.1 g. of a colorless oil which solidifies on cooling. Recrystallization of this crude solid from 15 ml. of ethanol gives 4.68 g. of white crystals (A) and of a colorless oil (B).

A major proportion of the crystalline product (A) comprises 9,13-docosadiene-2,21-dione. The crystals melt at 71.5–72.0° C.

Anal.—Calcd. for $C_{22}H_{38}O_2$: C, 79.02%; H, 11.44%; carbonyl equivalent, 167.3; theoretical hydrogen absorption, 0.121 g./g. of sample. Found: C, 78.6%; H, 11.31%; carbonyl equivalent, 122.1; quantitative hydrogenation, 0.0128 g. hydrogen/g. of sample.

The unsaturated diketone (A) forms a semicarbazone which melts at 163.5–165° C.

Anal.—Calcd. for $C_{24}H_{44}N_6O_2$: C, 64.25%; H, 9.88%; N, 18.74%. Found: C, 63.88%, 64.13%; H, 9.89%, 9.86%; N, 19.07%, 19.04%.

The colorless oil (B) is a mixture of isomers of docosadiene-2,21-dione.

Anal.—Calcd. for $C_{22}H_{38}O_2$: C, 79.02%; H, 11.44%; carbonyl equivalent, 167.3; theoretical hydrogen absorption, 0.0121 g./g. of sample. Found: C, 76.84%, 77.43%, 77.15%; H, 11.38%, 11.49%, 11.52%; carbonyl equivalent, 200.4 and 201.4; quantitative hydrogenation, 0.0116 and 0.0100 g. hydrogen/g. of sample.

Example III

A solution of 55.5 g. (0.2 mole) of ferrous sulfate heptahydrate in 120 ml. of nitrogen-saturated distilled water and 23.2 g. (0.2 mole) of 1-methylcyclopentyl hydroperoxide are added at equivalent rates to a solution of 34.1 g. (0.5 mole) of isoprene (freshly distilled, B. P., 34.5° C.) in 50 ml. of nitrogen-saturated methanol at −20° C. to −10° C. The rate of addition is regulated so that the reaction temperature can be maintained at −20° C. to −10° C., 10 minutes being required. The reaction mixture is then stirred for another 10 minutes and the excess isoprene is removed by means of a water aspirator. The aqueous reaction mixture is extracted with one 100-ml. and three 50-ml. portions of diethyl ether. Removal of the ether from the combined extracts by evaporation leaves 25.7 g. of a pale yellow oil. By cooling this mixture to about 0° C. there are obtained 0.95 g. of a white solid (A) melting at 66.5° C.–68° C. and 24.75 g. of a pale yellow oil (B).

Anal. of product (A).—Calcd. for $C_{12}H_{22}O_2$ (dodecane-2,11-dione): C, 72.70%; H, 11.20%; carbonyl equivalent, 99.2. Found: C, 72.46%; H, 10.89%; carbonyl equivalent, 75.0.

The melting point of dodecane-2,11-dione reported in the literature is 67.5° C.–68.5° C. This saturated diketone forms a semicarbazone melting at 202.5° C.–204.5° C.

Anal.—Calcd. for $C_{14}H_{28}N_6O_2$: C, 53.8%; H, 9.02%; N, 26.9%. Found: C, 54.82%, 54.90%; H, 9.09%, 9.05%; N, 25.55%, 25.82%.

Product (B), the yellow oil, is a mixture of isomers having the formula $$CH_3-C-(CH_2)_4-(C_5H_8)-(C_5H_8)-(CH_2)_4-C-CH_3$$
$$\overset{\|}{O} \qquad\qquad\qquad\qquad\qquad\qquad \overset{\|}{O}$$

resulting from both 1,2 and 1,4 addition of the isoprene unit.

Anal of oil (B).—Calcd. for $C_{22}H_{38}O_2$: C, 79.02%; H, 11.44%; carbonyl equivalent, 167.3; theoretical hydrogen absorption, 0.0121 g./g. of sample. Found: C, 75.58%, 75.82%; H, 11.31%, 11.42%; carbonyl equivalent, 143.4, 145.3; quantitative hydrogen absorption, 0.0124 and 0.0117 g. of hydrogen/g. of sample.

Example IV

A reaction vessel is charged with 75 g. of distilled water, 50 ml. of reagent grade urea, and 9 g. (0.07 mole) of methylcyclohexyl hydroperoxide, and the mixture is cooled to 12° C. Fifty-four grams (1 mole) of butadiene is condensed in the reaction mixture, and the reaction vessel is then flushed out with nitrogen. To this cold mixture there is added with vigorous stirring during 2½ hours a solution of 33 g. (0.085 mole) of ferrous ammonium sulfate hexahydrate in 125 g. of distilled water. When the addition is complete, the reaction mixture is stirred for another ½ hour with the temperature maintained at 12° C. The excess butadiene is then removed by heating the reaction mixture under reduced pressure at 45° C. The residue is treated with dilute sulfuric acid until the mixture attains a pH of 3 and is then extracted with seven 50 ml.-portions of diethyl ether. The combined ether extracts are dried over anhydrous sodium sulfate and then evaporated to dryness. There is obtained 11.0 g. of crude reaction product. This product is heated at 150° C. under a pressure of 18 mm. of mercury for several minutes with no loss in weight, indicating the absence of volatile reaction products. A carbonyl determination gives a value of 5.48 milliequivalents per gram which is 92% of the theoretical. The infrared spectra obtained with this product show that 75% of the product is 9,13-docosadiene-2,21-dione and that a strictly transconfiguration is maintained about the double bonds. The remaining 25% of the reaction product consists of the isomeric unsaturated diketone resulting from 1,2-addition of the butadiene.

It will be understood that the above examples are merely illustrative and that the present invention broadly comprises contacting an ethylenically unsaturated compound with a tertiary cyclic hydroperoxide in the presence of a redox reducing agent, in a solvent for the reactants, whereby long-chain diketones are formed and, with respect to new compounds, the long-chain unsaturated diketones having two nonconjugated ethylenic double bonds of the formula

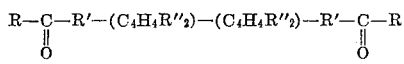

wherein R is alkyl, aryl, or aralkyl, R' is an acyclic saturated hydrocarbon having a chain of at least 4 carbon atoms separating the carbonyl and $(C_4H_4R''_2)$ groups, and R is hydrogen, halogen, alkyl, aryl, or aralkyl.

The invention is applicable to tertiary cyclic hydroperoxides generally. Specific tertiary cyclic hydroperoxides other than those used in the examples, well adapted for use in the process, include 1-phenylcyclohexyl hydroperoxide, 1-benzylcyclopentyl hydroperoxide, 1-methylcyclobutyl hydroperoxide, 1-ethylcyclopentyl hydroperoxide, and 1-methylcyclodecyl hydroperoxide. Tertiary cyclic hydroperoxides having 5 to 6 annular carbon atoms, inclusive, are especially preferred in the process of this invention.

The tertiary cyclic hydroperoxides used in the instant process can be prepared by known methods, for example, by air oxidation of the appropriate hydrocarbon or by reaction of tertiary cyclic alcohols with hydrogen peroxide. The preparation of 1-methylcyclopentyl hydroperoxide by the air oxidation of methylcyclopentane is described by Hawkins in J. Chem. Soc. 1950, 2798. The reaction of tertiary alcohols with hydrogen peroxide is described by Milas and Harris in J. Am. Chem. Soc. 60, 2434 (1938).

In addition to the specific ethylenically unsaturated compounds mentioned in the examples, other aliphatic and cycloaliphatic ethylenically unsaturated compounds can be used in the process of this invention. Specific examples of such compounds include ethylene, isobutylene, styrene, vinyl acetate, vinyl chloride, vinylidene chloride, tetrafluoroethylene, acrylonitrile, methyl acrylate, and butyl methacrylate, and such conjugated dienes as 1,3-pentadiene, 2,3-dimethyl-1,3-butadiene, 2,3-dichloro-1,3-butadiene, 2-fluoro-1,3-butadiene, 2 - chloro-1,3-butadiene (chloroprene), 2-phenyl-1,3-butadiene, and cyclopentadiene.

Specific long-chain unsaturated diketones forming a part of this invention include, in addition to those of the examples, 13,17-triacontadiene-2,29-dione, 1,22 - diphenyl-9,13 - docosadiene-2,21-dione, and 10,14-tetracosadiene-10,14-dichloro-3,22-dione.

The redox reducing agents used in this invention are those reducing agents commonly employed in the redox art. The term "redox" is here used in its accepted sense to denote oxidation-reduction reactions in which an electron transfer occurs with the simultaneous formation of a free radical. In order for this free radical formation to occur, there must be present a substance which acts as the reducing agent for the peroxide compound, i. e., the tertiary cyclic hydroperoxide. Suitable redox reducing agents include the heavy metals capable of existing in several valence states, such as iron, cobalt, manganese, copper, chromium and the like, as well as l-ascorbic acid, sodium formaldehyde sulfoxylate, sodium bisulfite, the reducing sugars, and other reducing agents commonly used in the redox art.

The tertiary cyclic hydroperoxide and the reducing agent are preferably used in substantially stoichiometric proportions since a controlled degree of reduction is desired. Excess reducing agent tends to carry the reduction of the tertiary cyclic hydroperoxide too far with a resulting decrease in the yield of the desired diketone. The ethylenically unsaturated compound is preferably used in excess of the amount stoichiometrically required to form the diketone containing two units derived from the ethylenically unsaturated compound. Ratios of from 1 to 5, and preferably 1 to 3, moles of ethylenically unsaturated compound per mole of tertiary cyclic hydroperoxide are generally satisfactory. When less than one mole of unsaturated compound per mole of tertiary cyclic hydroperoxide is used, the coupling of the two radicals derived from the hydroperoxide with no intermediate radicals derived from the ethylenically unsaturated compound tends to occur. When too large an excess of the ethylenically unsaturated compound is used, higher molecular weight diketones result from the formation of trimers and higher polymers of the ethylenically unsaturated compound which then unite with ketone terminal units.

Instead of a stoichiometrical amount of ferrous ion, the process of this invention can, if desired, be carried out with a trace of a multivalent metal such as, for example, ferrous or ferric ion, together with another of the above-mentioned reducing agents in an amount equivalent to the tertiary cyclic hydroperoxide, which serves to convert the ferric ion to ferrous ion as fast as the ferric ion is formed. In this type of process, the heavy metal may be thought of as a promoter. Ferrous ion is preferred as such or as the promoter because of its efficiency and low cost.

Temperatures used in this process are not critical, and may vary over a wide range, the particular temperature used depending on the particular reactants being employed. Temperatures of from −100° C. to 100° C. or higher are operable. The temperature selected in any particular case should, of course, be below the decomposition temperature of any reactants being employed and below the temperature at which undesirable side reactions take place. For example, when butadiene is used as the ethylenically unsaturated compound, it is preferred to use temperatures of about −20° C. to about 10° C. in order to keep the volatile butadiene in the reaction system at atmospheric pressure. Of course, higher temperatures can be used with volatile reactants such as butadiene if the reaction is carried out in a closed container under pressure. Likewise, reaction temperatures below 0° C. are preferred when chloroprene is used in order to minimize polymerization of this particular diene.

The reaction time likewise is not critical. Generally sufficient time should be used to add the redox reducing agent to the reaction mixture at a rate to permit the reaction temperature to be maintained in the desired range. Reaction times varying from 4 minutes to several hours give good results. However, longer times can be used if desired. The exact time required in any particular case depends on the quantity of reactants being used and on the efficiency of the means for controlling the reaction temperature.

The long-chain unsaturated diketones of this invention are useful in many applications. They are useful as chemical intermediates; for exampe, they can be oxidized to corresponding dicarboxylic acids which are useful in the preparation of condensation polymers such as in condensation with difunctional alcohols and amines to form polyesters and polyamides. They are also useful as plasticizers, surface-active agents and as perfume ingredients. The presence of two nonconjugated ethylenic bonds in the unsaturated diketones of this invention render them useful as intermediates for reaction with compounds which add to double bonds.

As previously mentioned, long-chain diketones in general have many uses and heretofore there has not been available any ready process for preparing them. These diketones may be satisfactorily prepared by the instant process at reasonable cost.

As many apparently widely different embodiments of this invention may be made without departing from the spirit and scope thereof, it is to be understood that the invention is not limited to the specific embodiments thereof except as defined in the appended claims.

The invention claimed is:

1. A long-chain unsaturated diketone having two nonconjugated ethylenic double bonds, of the formula

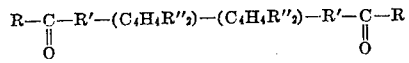

wherein R is from the group consisting of alkyl, aryl, and aralkyl, R' is an acyclic saturated hydrocarbon radical having a chain of at least 4 carbon atoms separating the carbonyl and ($C_4H_4R''_2$) groups, and R'' is from the group consisting of hydrogen, halogen, alkyl, aryl, and aralkyl.

2. 8,12-Eicosadiene-2,19-dione.

3. Process of preparing a long-chain diketone which comprises contacting an ethylenically unsaturated compound free of reactive groups other than the ethylenic unsaturation with a tertiary cyclic hydroperoxide in the presence of a redox reducing agent, in a solvent for the reactants.

4. Process as set forth in claim 3 wherein said hydroperoxide is present in a proportion of 1–5 moles per mole of said ethylenically unsaturated compound and said hydroperoxide and said redox reducing agent are present in substantially stoichiometric proportion.

5. Process as set forth in claim 4 wherein said ethylenically unsaturated compound is a 1,3-conjugated diene.

6. Process as set forth in claim 5 wherein said hydroperoxide is a tertiary cyclic hydroperoxide having 5 to 6 annular carbon atoms, inclusive.

7. Process as set forth in claim 6 wherein said redox reducing agent is ferrous sulfate.

8. Process of preparing a long-chain diketone which comprises contacting 1,3-butadiene with a tertiary cyclic hydroperoxide having 5 to 6 annular carbon atoms, inclusive, in the presence of a redox reducing agent, in a solvent for the reactants.

9. Process as set forth in claim 8 wherein said hydroperoxide is present in a proportion of 1–3 moles per mole of 1,3-butadiene and said hydroperoxide and said redox reducing agent are present in substantially stoichiometric proportions.

10. Process as set forth in claim 9 wherein said hydroperoxide is 1-methylcyclopentyl hydroperoxide.

11. Process as set forth in claim 10 wherein said redox reducing agent is ferrous sulfate.

12. 9,13-docosadiene-2,21-dione.

13. A mixture of isomers having the formula

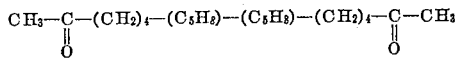

DONALD DRAKE COFFMAN.
HARRY NORMAN CRIPPS.

References Cited in the file of this patent

UNITED STATES PATENTS

| Number | Name | Date |
|---|---|---|
| 2,477,621 | Kharasch | Aug. 2, 1949 |
| 2,575,014 | Hawkins | Nov. 13, 1951 |
| 2,601,224 | Roedel | June 24, 1952 |
| 2,621,212 | Ladd | Dec. 9, 1952 |

OTHER REFERENCES

George et al.: "Transactions Faraday Society," vol. 42 (1946), pp. 94–97.

Hawkins et al.: "Jour. Chem. Soc.," (London) 1950, pp. 2804–2808.